United States Patent
Al-Nadawi et al.

(10) Patent No.: US 12,030,657 B1
(45) Date of Patent: Jul. 9, 2024

(54) SYSTEM AND METHODS FOR POWER SPLIT ALGORITHM DESIGN FOR AIRCRAFT HYBRID ELECTRIC PROPULSION BASED ON COMBINED ACTOR-CRITIC RL AGENT AND CONTROL BARRIER FUNCTION FILTER

(71) Applicant: RTX CORPORATION, Farmington, CT (US)

(72) Inventors: Yasir Al-Nadawi, Vernon, CT (US); Milos Ilak, Hoboken, NJ (US); Pratyush Kumar, East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/496,117

(22) Filed: Oct. 27, 2023

(51) Int. Cl.
*B64D 31/00* (2024.01)
*F01D 15/10* (2006.01)
*B64D 27/02* (2006.01)

(52) U.S. Cl.
CPC ............ *B64D 31/00* (2013.01); *F01D 15/10* (2013.01); *B64D 27/026* (2024.01); *F05D 2270/053* (2013.01); *F05D 2270/31* (2013.01); *F05D 2270/709* (2013.01)

(58) Field of Classification Search
None
See application file for complete search history.

(56) References Cited

U.S. PATENT DOCUMENTS

| | | | |
|---|---|---|---|
| 11,474,540 B2 | 10/2022 | Fillingham et al. | |
| 2014/0373533 A1* | 12/2014 | Jensen | F01K 27/02 903/915 |
| 2016/0194087 A1* | 7/2016 | Nalim | F02C 5/04 903/930 |
| 2020/0277078 A1* | 9/2020 | Smith | B64D 27/24 |
| 2022/0025834 A1* | 1/2022 | Kirkbride | B64D 27/18 |

FOREIGN PATENT DOCUMENTS

| | | |
|---|---|---|
| CN | 113255143 | 11/2021 |
| CN | 115563716 | 1/2023 |
| CN | 115714382 | 2/2023 |
| CN | 114865696 | 6/2023 |
| WO | 2023275089 | 1/2023 |

* cited by examiner

*Primary Examiner* — Shafiq Mian
(74) *Attorney, Agent, or Firm* — Carlson, Gaskey & Olds, P.C.

(57) ABSTRACT

A method for a hybrid electric propulsion (HEP) system includes utilizing a soft actor-critic agent, which includes at least one neural network, and a control barrier function (CBF) filter to obtain a power splitting profile for an HEP system. The power splitting profile includes an electric motor power for an electric motor of the HEP system and a gas turbine power for a gas turbine of the HEP system. The electric motor power and gas turbine power collectively provide a combined HEP output power. The method also includes, during a flight of an aircraft that includes the HEP system, performing an output action for the HEP system based on the power splitting profile. The utilizing is performed based on a predefined fuel consumption objective and a state of charge of at least one battery that powers the electric motor. A system for a HEP system is also disclosed.

20 Claims, 7 Drawing Sheets

SYSTEM CONSTRAINTS

| PARAMETER | MINIMUM VALUE | MAXIMUM VALUE |
|---|---|---|
| TOTAL BATTERY SoC | $SoC_{min}$ | $SoC_{max}$ |
| GAS TURBINE POWER ($P_{gt}$) | $P_{gt\_min}$ | $P_{gt\_max}$ |
| ELECTRIC MOTOR POWER ($P_{em}$) | $P_{em\_min}$ | $P_{em\_max}$ |

FIG.3

SYSTEM AND METHODS FOR POWER SPLIT ALGORITHM DESIGN FOR AIRCRAFT HYBRID ELECTRIC PROPULSION BASED ON COMBINED ACTOR-CRITIC RL AGENT AND CONTROL BARRIER FUNCTION FILTER

BACKGROUND

This application relates to hybrid electric propulsion (HEP) systems.

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor.

HEP systems utilize a combination of electric power from one or more electric motors and combustion power from one or more gas turbines to provide propulsion for an aircraft, and have been identified as a step towards reducing aircraft fuel consumption, reducing carbon dioxide emissions, and supporting sustainable aviation. The electric motor is powered by a renewable power source, such as one or more lithium-ion batteries. This addition of the renewable power source may lead to higher fuel savings and less carbon footprint of future aircraft.

Given the current status of battery technology, and the varying duration of flights, it is assumed that many flights of aircraft utilizing HEP systems will not be able to rely on electric power alone, and some combustion power will need to be utilized. A charge-depleting charge-sustaining approach has been proposed and utilized in hybrid ground vehicles, which depletes a battery charge to its minimum limits at the beginning of a journey, but this is not an optimal solution for aircraft or even ground vehicles, as it quickly drains electrical power and may thereby adversely affect the life of the battery.

SUMMARY

A method for a HEP system according to an example embodiment of the present disclosure includes utilizing a soft actor-critic agent, which includes at least one neural network, and a control barrier function (CBF) filter to obtain a power splitting profile for an HEP system. The power splitting profile includes an electric motor power for an electric motor of the HEP system and a gas turbine power for a gas turbine of the HEP system. The electric motor power and gas turbine power collectively provide a combined HEP output power. The method includes, during a flight of an aircraft that includes the HEP system, performing an output action for the HEP system based on the power splitting profile. The utilizing is performed based on a predefined fuel consumption objective and a state of charge of at least one battery that powers the electric motor.

In a further embodiment of the foregoing embodiment, the method includes iteratively repeating the utilizing and performing throughout the flight to obtain a plurality of sequential power splitting profiles and performing output actions for the plurality of sequential power splitting profiles.

In a further embodiment of any of the foregoing embodiments, the CBF filter performs filtering based on a CBF certificate trained to implement one or more CBF constraints and one or more system constraints. The utilizing the CBF filter during a given iteration includes: obtaining a power splitting profile from the soft actor-critic agent; utilizing the CBF filter to determine whether the power splitting profile complies with the one or more CBF constraints and the one or more system constraints; and, based on the power splitting profile not complying with the one or more CBF constraints, adjusting the power splitting profile. The performing the output action is performed based on the adjusted power splitting profile.

In a further embodiment of any of the foregoing embodiments, the one or more CBF constraints include at least one of a first constraint based on mass rate of change dynamics of the HEP system due to fuel consumption, and a second constraint based on battery state of charge dynamics of the at least one battery.

In a further embodiment of any of the foregoing embodiments, the one or more system constraints include at least one of a predefined range of acceptable battery state of charge values, a predefined range of acceptable turbine output power values for the gas turbine, and a predefined range of acceptable combined HEP output power values for the HEP system.

In a further embodiment of any of the foregoing embodiments, the method also includes utilizing deep learning to train the CBF filter based on a plurality of predefined expert trajectories that include power splitting profiles, and creating the CBF certificate based on ones of the predefined expert trajectories that satisfy the one or more CBF constraints.

In a further embodiment of any of the foregoing embodiments, the at least one neural network includes at least one actor neural network and at least one critic neural network. The method also includes, after the training of the CBF filter, training the at least one neural network by iteratively: cooperatively utilizing the at least one actor neural network and the at least one critic neural network to generate a randomized power splitting profile based on an output of a reward function output from a previous iteration; ranking the randomized power splitting profile using the reward function; and providing an output of the reward function to the soft actor-critic agent for a subsequent iteration.

In a further embodiment of any of the foregoing embodiments, the method also includes, during each iteration, and prior to performing the ranking, providing the randomized power splitting profile to the CBF filter; utilizing the CBF filter to determine whether the randomized power splitting profile complies with the one or more CBF constraints; and, based on the randomized power splitting profile complying with the one or more CBF constraints, adjusting the randomized power splitting profile, and performing the ranking for the adjusted randomized power splitting profile.

In a further embodiment of any of the foregoing embodiments, the cooperatively utilizing the at least one actor neural network and the at least one critic neural network to generate a randomized power splitting profile includes, during each of a plurality of iterations: utilizing a replay buffer to obtain a previous power splitting profile, and further basing the cooperatively utilizing on the previous power splitting profile.

In a further embodiment of any of the foregoing embodiments, the fuel consumption objective is to minimize fuel consumption while avoiding full reliance on the electric motor for delivering the combined HEP output power at a beginning stage of a flight.

A system for a HEP system according to an example embodiment of the present disclosure includes processing circuitry operatively connected to memory. The processing circuitry is configured to utilize a soft actor-critic agent, which includes at least one neural network, and a CBF filter to obtain a power splitting profile for an HEP system. The power splitting profile includes an electric motor power for an electric motor of the HEP system and a gas turbine power for a gas turbine of the HEP system. The electric motor power and gas turbine power collectively provide a combined HEP output power. The processing circuitry is also configured to, during a flight of an aircraft that includes the HEP system, perform an output action for the HEP system based on the power splitting profile. The utilization is performed based on a predefined fuel consumption objective and a state of charge of at least one battery that powers the electric motor.

In a further embodiment of the foregoing embodiment, the processing circuitry is configured to iteratively repeat the utilization and performance throughout the flight to obtain a plurality of sequential power splitting profiles and perform output actions for the plurality of sequential power splitting profiles.

In a further embodiment of any of the foregoing embodiments, the CBF filter performs filtering based on a CBF certificate trained to implement one or more CBF constraints and one or more system constraints. To utilize the CBF filter, the processing circuitry is configured to, during a given iteration: obtain a power splitting profile from the soft actor-critic agent; utilize the CBF filter to determine whether the power splitting profile complies with the one or more CBF constraints and the one or more system constraints; and, based on the power splitting profile not complying with the one or more CBF constraints, adjust the power splitting profile. The performance of the output action is based on the adjusted power splitting profile.

In a further embodiment of any of the foregoing embodiments, the one or more CBF constraints include at least one of: a first constraint based on mass rate of change dynamics of the HEP system due to fuel consumption, and a second constraint based on battery state of charge dynamics of the at least one battery.

In a further embodiment of any of the foregoing embodiments, the one or more system constraints include at least one of: a predefined range of acceptable battery state of charge values, a predefined range of acceptable turbine output power values for the gas turbine, and a predefined range of acceptable combined HEP output power values for the HEP system.

In a further embodiment of any of the foregoing embodiments, the processing circuitry is configured to utilize deep learning to train the CBF filter based on a plurality of predefined expert trajectories that include power splitting profiles, and create the CBF certificate based on ones of the predefined expert trajectories that satisfy the one or more CBF constraints.

In a further embodiment of any of the foregoing embodiments, the at least one neural network includes at least one actor neural network and at least one critic neural network. The processing circuitry is configured to, after the training of the CBF filter, train the at least one neural network by iteratively: cooperatively utilizing the at least one actor neural network and the at least one critic neural network to generate a randomized power splitting profile based on an output of a reward function output from a previous iteration; ranking the randomized power splitting profile using the reward function; and providing an output of the reward function to the soft actor-critic agent for a subsequent iteration.

In a further embodiment of any of the foregoing embodiments, the processing circuitry is configured to, during each iteration and prior to performing the ranking: provide the randomized power splitting profile to the CBF filter; utilize the CBF filter to determine whether the randomized power splitting profile complies with the one or more CBF constraints; and, based on the randomized power splitting profile complying with the one or more CBF constraints, adjust the randomized power splitting profile, and perform the ranking for the adjusted randomized power splitting profile.

In a further embodiment of any of the foregoing embodiments, to cooperatively utilize the at least one actor neural network and the at least one critic neural network to generate a randomized power splitting profile, the processing circuitry is configured to, during each of a plurality of iterations: utilize a replay buffer to obtain a previous power splitting profile, and further base the cooperative utilization on the previous power splitting profile.

In a further embodiment of any of the foregoing embodiments, the fuel consumption objective is to minimize fuel consumption while avoiding full reliance on the electric motor for delivering the combined HEP output power at a beginning stage of a flight.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 3 is a schematic view of an example set of system constraints for the example HEP system of FIG. 1.

DETAILED DESCRIPTION

This application relates generally to operating a HEP system based on output from an actor-critic (SAC) agent (e.g., a soft actor-critic agent) and a control barrier function (CBF) filter.

Figure 1:
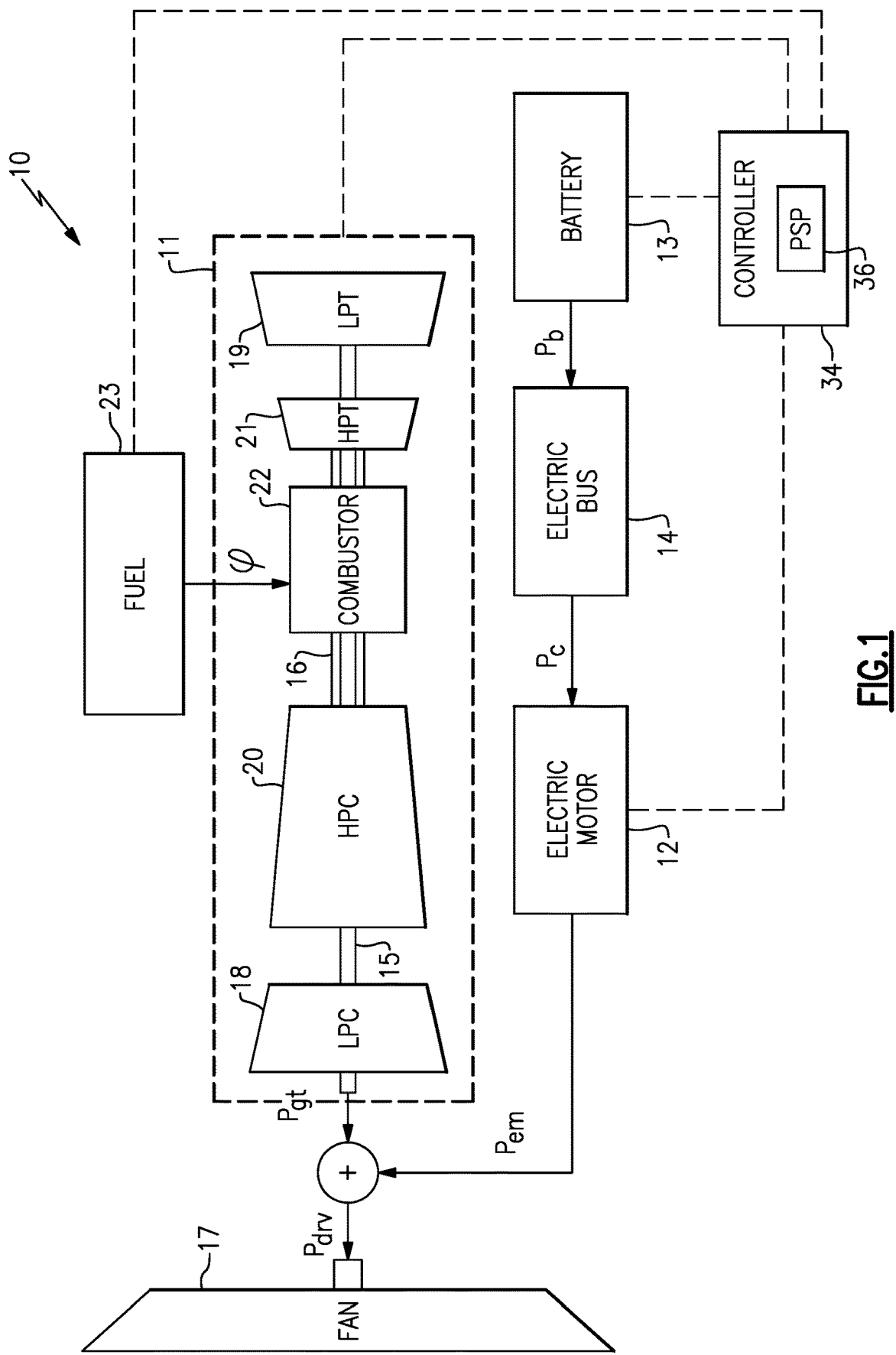
FIG. 1 is a schematic view of an example parallel hybrid electric propulsion (HEP) system.

FIG. 1 is a schematic view of an example parallel hybrid electric propulsion (HEP) system 10 for an aircraft. The HEP system 10 includes a gas turbine 11, which provides gas turbine power $P_{gt}$ that is combustion-based, and at least one electric motor 12 that provides electric power $P_{em}$. The gas turbine 11 and electric motor 12 cooperate according to a power splitting profile to provide a combined HEP output power $P_{drv}$. The power splitting profile indicates a power split between the turbine power $P_{gt}$ and electric power $P_{em}$. At various times, the power split between the gas turbine 11 and electric motor 12 may rely 100% on the combustion-based power $P_{gt}$, 100% on the electric power $P_{em}$, or on some combination of the two.

The HEP system 10 includes one or more batteries 13 (e.g., lithium-ion batteries, etc.) that provide battery chemical power Pb. An electric bus 14 receives the power Pb and outputs electric power Pc to the electric motor 12. As discussed above, the electric motor 12 provides electric power $P_{em}$ in the HEP system 10.

The gas turbine 11 includes a low speed spool 15 and a high speed spool 16 mounted for rotation about an engine central longitudinal axis. The low speed spool 15 generally interconnects a fan 17, a first (or low) pressure compressor 18, and a first (or low) pressure turbine 19. The high speed spool 16 interconnects a second (or high) pressure compressor 20 and a second (or high) pressure turbine 21. A combustor 22 is arranged between the high pressure compressor 20 and the high pressure turbine 21. A core airflow is compressed by the low pressure compressor 18 then the high pressure compressor 20, is mixed and burned with fuel 23 in the combustor 22, and is then expanded over the high pressure turbine 21 and low pressure turbine 19. In FIG. 1, φ represents a fuel consumption rate. The fuel 23 may include a traditional carbon-based fuel or a biofuel (e.g., sustainable aviation fuel, etc.). In another example, the fuel 23 may include a hydrogen-based fuel (e.g., LH2, etc.) or other non-carbon based fuel.

The electric motor 12 may be configured to provide propulsion by driving rotation of the spools 15 and/or 16. In one nonlimiting example, a first electric motor 12 drives rotation of the low speed spool 15, and a second electric motor 12 drives rotation of the high speed spool 16. The variable φ represents a fuel consumption rate of the gas turbine 11.

The HEP system 10 includes a controller 34 that is configured to control the gas turbine 11 and the electric motor 12 according to a power splitting profile 36 that indicates an allocation of the drive power Pan between the electric power $P_{em}$ and the gas turbine power Pgr that collectively provide the combined HEP output power $P_{drv}$. The controller 34 is in communication with the battery 13 to determine a state of charge (i.e., charge level) of the battery 13, and is in communication with a fuel source (or related component) to monitor fuel consumption of the HEP system 10. Throughout a flight, the controller 34 obtains and utilizes a plurality of power splitting profiles according to a fuel consumption objective (e.g., to minimize fuel consumption of the gas turbine 11 while avoiding full reliance on the electric motor 12 for delivering the combined HEP output power Pan at a beginning stage of a flight, such as any one or combination of takeoff, climb-out, flight duration prior to reaching a predefined altitude (e.g., after takeoff), etc.).

It is understood that the parallel hybrid electric architecture depicted in FIG. 1 is a non-limiting example, and that other architectures could be used, such as a series-hybrid propulsion architecture (in which case the same control algorithm could be used, but the simulation environment would be different to accommodate the architectural change). Also, although only one HEP system 10 is shown in FIG. 1, it is understood that multiple HEP systems 10 may be included on a given aircraft (e.g., two or four, depending on how many sources of propulsion are desired on the aircraft).

Figure 2C:
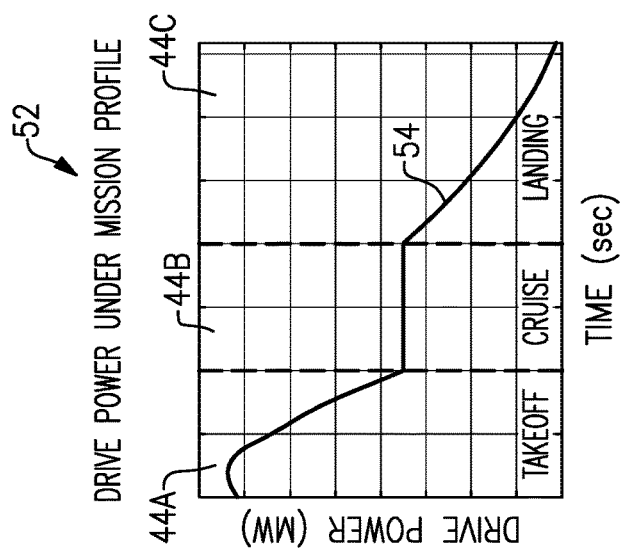
FIG. 2C is a diagram of an example aircraft drive power during an example flight.
Figure 2B:
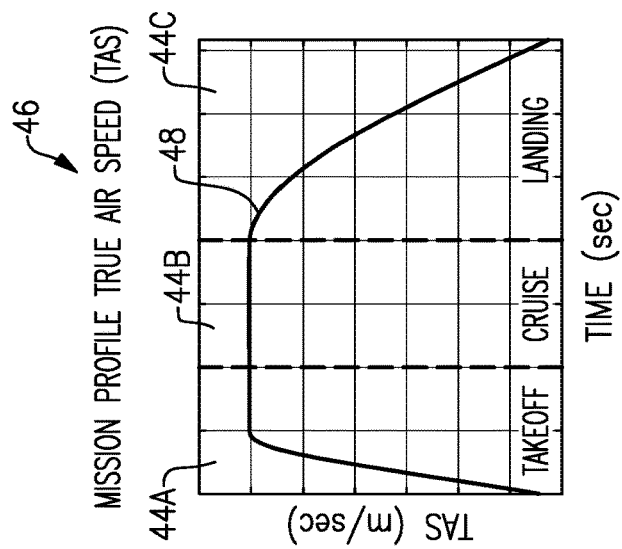
FIG. 2B is a diagram of an example aircraft true air speed during an example flight.
Figure 2A:
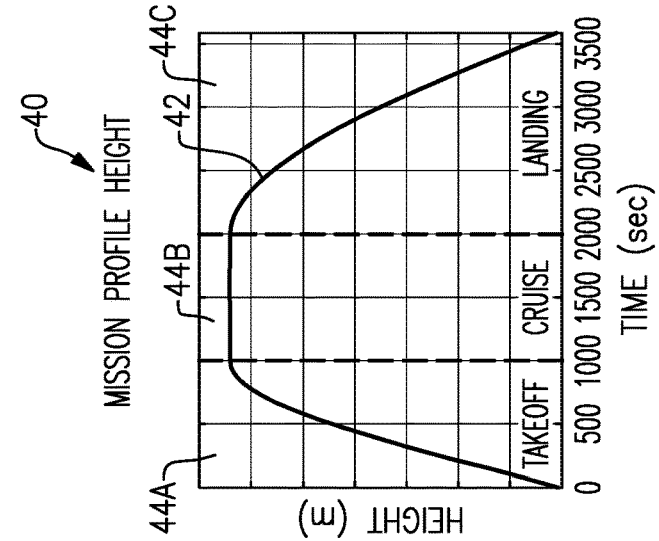
FIG. 2A is a diagram of an example aircraft height during an example flight.

FIG. 2A is a diagram 40 of an example aircraft height 42 during an example flight that includes a takeoff phase 44A, cruise phase 44B, and landing phase 44C. As shown, the aircraft generally increases its height during the takeoff phase 44A, generally maintains that height during a cruise phase 44B, and generally decreases its height during the landing phase 44C.

FIG. 2B is a diagram 46 of an example aircraft true air speed 48 during the example flight. As shown, the aircraft generally increases its true air speed during the takeoff phase 44A, generally maintains that true air speed during the cruise phase 44B, and generally decreases its true air speed during the landing phase 44C.

FIG. 2C is a diagram 52 of an example aircraft drive power 54 (Pan) during the example flight. As shown, the aircraft true air speed quickly peaks and then generally decreases during the takeoff phase 44A, generally maintains the drive power during the cruise phase 44B, and generally decreases its drive power during the landing phase 44C.

The mission profile variables discussed in FIGS. 2A-C are assumed to be generated independently of the control algorithm by mission planning software.

FIG. 3 is a schematic view of an example set 50 of system constraints for the example HEP system 10 of FIG. 1. The example set 50 includes a range of values spanning from a minimum to a maximum value for each of total battery state of charge ("SoC") 52, gas turbine power (Pgr) 54, and electric motor power ($P_{em}$) 56. These system constraint ranges set up targets to avoid, e.g., overcharging or over-utilizing the battery 13, and generating too much output power from either the gas turbine 11 or electric motor 12. The approach allows adding other constraints represented by system variables. Feasibility solutions of the optimization program might be in question every time one adds a variable, but in concept, the present disclosure is not restricted to only these constraints' inequalities.

Determining an optimal power splitting profile 36 for the drive power $P_{drv}$ while also operating within the set 50 of system constraints is a complex and non-convex problem which is difficult to optimize according to the fuel consumption objective. The techniques discussed below provide a novel way for achieving that optimization.

Figure 4:
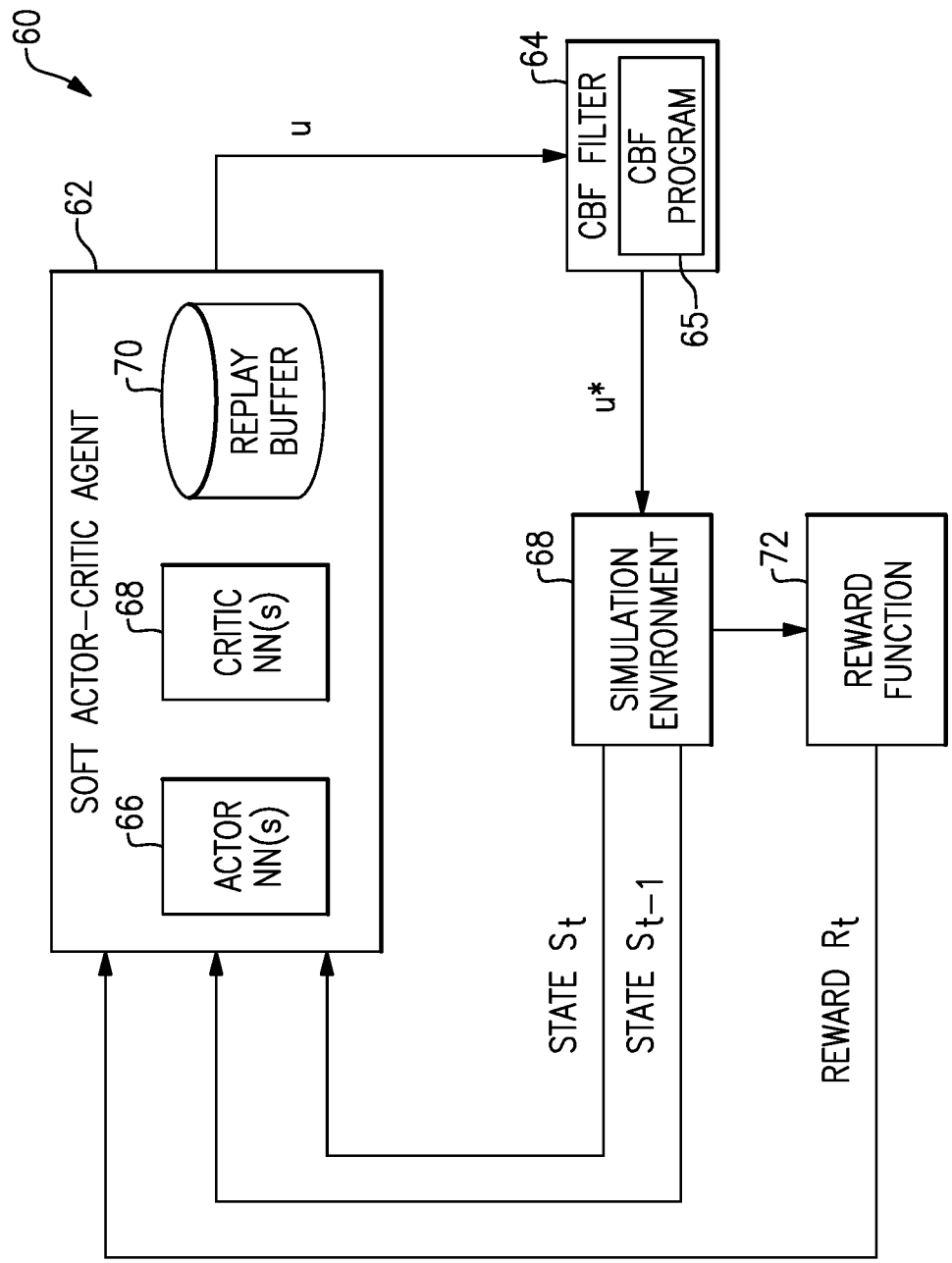
FIG. 4 is a schematic view of a system for determining a power splitting profile for the HEP system of FIG. 1.

FIG. 4 is a schematic view of a system 60 for determining a power splitting profile for the HEP system of FIG. 1, and will be discussed in connection with FIG. 5, which is a flowchart of an example method 100 for the HEP system 10. The system 60 may be implemented partially or entirely by the controller 34, for example.

The system 60 includes a soft actor-critic (SAC) agent 62 and a control barrier function (CBF) filter 64. SAC, is a known off-policy actor-critic algorithm based on the maximum entropy reinforced learning framework (abbreviated as SAC-RL).

The SAC agent 62 includes a plurality of neural networks, namely at least one actor neural network 66 and at least one critic neural network 68. In this framework, an "actor" component of the SAC agent 62 aims to simultaneously maximize expected return and entropy, that is, to succeed at the task of generating a power splitting profile while acting randomly (e.g., as randomly as possible). The SAC-RL approach as used herein is stable, and achieves good performance across different random seeds.

In the context of SAC, a state-of-the-art Reinforcement Learning (RL) algorithm, the critic network is a neural network that estimates the Q-value of a state-action pair. The Q-value represents the expected return (cumulative reward) of taking a specific action in a given state and then following the policy thereafter.

In one or more embodiments, the SAC algorithm actually maintains two separate critic neural networks (and their target neural networks) to improve stability during training, similar to Deep Q Networks (DQN) where multiple critic neural networks can provide a more stable learning target. The two critics are used to compute a minimum Q-value, which is then used to update both the actor and the critics themselves. However, it is understood that a single critic neural network could be utilized if desired.

The primary roles of the critic neural network(s) in SAC are: (1) evaluating actions: given a state and an action, the critic provides an estimate of the expected return of that action and (2) training the actor: the actor network is updated to take actions that maximize the expected Q-value, as estimated by the critic.

In SAC, the critics are also involved in the entropy regularization term, ensuring that the policy remains stochastic and explores the environment effectively.

The actor neural network(s) 66 and critic neural network(s) 68 are cooperatively utilized to generate a randomized power splitting profile (shown as a "state" of "u") based on a reward output R, from a previous iteration. A replay buffer 70 stores previous power splitting profiles, and during a given iteration provides a previous power splitting profile that is utilized in the generation of the state u (which includes a power splitting profile).

The replay buffer plays an important role in SAC and many other off-policy reinforcement learning algorithms by storing past experiences, which are typically represented as tuples of (state, action, reward, next state, done).

Some reasons for using a replay buffer in SAC include the following:

1. Data Efficiency: Reinforcement learning can often require a large amount of data/experience to learn effectively. By storing and reusing past experiences, the algorithm can learn more efficiently from the data it has already collected.

2. Breaking Temporal Correlations: Consecutive experiences can be highly correlated, which can be problematic for the stability of deep neural network training. By sampling experiences randomly from the replay buffer, these temporal correlations are broken, leading to more stable and effective learning.

3. Off-policy Learning: SAC is an off-policy algorithm, meaning it learns from past experiences rather than just the most recent ones. The replay buffer enables the algorithm to learn from a diverse set of experiences, not just the ones encountered in the current policy trajectory.

4. Smoothing Out Learning: In environments with high variance or where rare but crucial events occur, the replay buffer ensures that the agent continues to learn from those rare experiences even if they do not occur frequently.

In SAC, when the agent interacts with the environment and collects new experiences, they are stored in the replay buffer. During the learning phase, batches of experiences are sampled randomly from the buffer to update the actor and critic networks. This process helps stabilize the training and make better use of the collected data.

A reward function 72, discussed in more detail below, provides the reward output R, that ranks the power splitting profile during each of a plurality of iterations, and provides the reward output R, to the SAC agent 62 for consideration.

The state u is passed to CBF filter 64, which includes a CBF program 65 that includes a Control Barrier Certificate. The CBF filter 64 performs filtering based on the Control Barrier Certificate to implement one or more CBF constraints 74 and one or more system constraints 50 (see FIG. 7). The CBF constraints include at least one of first constraint based on mass rate of change dynamics of the HEP system due to fuel consumption, and a second constraint based on battery state of charge dynamics of the at least one battery. However, it is understood that additional CBF constraints could be used depending on the system constraints at issue.

Control Barrier Functions and Control Barrier Certificates both involve ensuring safety properties for dynamical systems, but they serve different purposes and have different formal definitions, as discussed below.

The purpose of CBFs in general is for designing control laws that ensure that the state of a system does not enter an "unsafe" region (i.e., a region that would not comply with the system constraints listed in FIG. 3). A function h(x) is called a CBF if, under the designed control law, it prevents the system's state from entering an "unsafe" region (i.e., a region that would not comply with the system constraints 50). For a system with dynamics x=f(x, u), a valid control u must satisfy some conditions based on h(x) to ensure "safety."

The purpose of barrier certificates in general is to prove or certify that, under a given control law, the state of a system will never enter an unsafe region. A function h(x) serves as a Barrier Certificate if, throughout its evolution, the system's dynamics ensure that the value of h(x) never reaches a certain threshold, thereby certifying the system's safety without needing to explicitly design a control law.

Throughout a flight (and during training), the SAC agent 62 iteratively generates new power splitting profiles. During a given iteration, the CBF filter 64 is utilized by obtaining a randomized power splitting profile u from the SAC agent 62, determining whether the power splitting profile complies with the one or more CBF constraints 74 and the one or more system constraints 50. If the CBF filter 64 adjusts a randomized power splitting profile that it receives, it is the adjusted power splitting profile that is passed to a simulation environment 68 and reward function 72.

Figure 5:
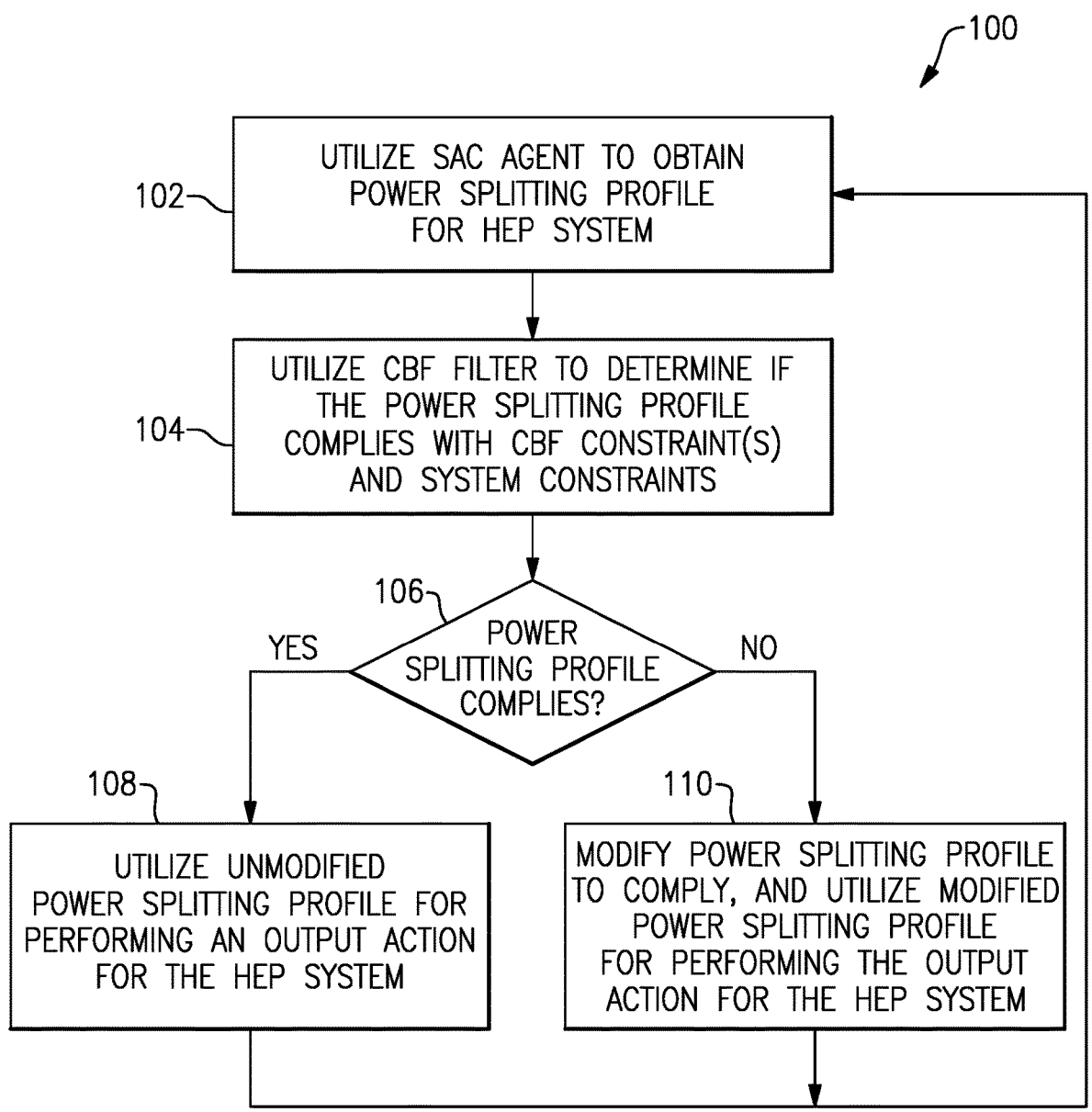
FIG. 5 is a flowchart of an example method for a HEP system.

FIG. 5 is a flowchart of an example method 100 for a HEP system (e.g., the HEP system 10 of FIG. 1). Referring now to FIG. 5, the SAC agent 62 is used to obtain a randomized power splitting profile for the HEP system 10 (step 102).

The utilizing of step 102 is performed based on a predefined fuel consumption objective and a state of charge of the least one battery 13 that powers the electric motor 12. The CBF filter 64 is used to determine if the randomized power splitting profile complies with the CBF constraints 74 and system constraints 50 (step 104).

If the power splitting profile complies with the CBF constraints 74 and system constraints 50 (a "yes" to block 106), the unmodified power splitting profile u is utilized for performing an output action for the HEP system (step 108), and the method 100 iteratively repeats.

Otherwise, if the power splitting profile does not comply with the CBF constraints 74 and/or system constraints 50 (a "no" to block 106), the power splitting profile is modified to comply (see u* in FIG. 4), the modified power splitting profile is utilized for performing the output action for the HEP system (step 110), and the method 100 iteratively repeats.

The output action of steps 108-110 is performed during a flight, and may include one or more of the following, for example: controlling the HEP system 10 during the flight to automatically implement the power splitting profile and/or providing a notification of the power splitting profile (e.g., to a pilot) as a recommendation for the pilot to perform an action to optimize fuel efficiency, for example.

The method 100 is iteratively repeated throughout a flight to obtain a plurality of sequential power splitting profiles, and output actions are performed for the plurality of sequential power slitting profiles.

Referring again to FIG. 4, during training of the SAC agent 62, a simulation environment 68 (e.g., an engine test environment, a computer simulation, etc.) receives the power splitting profile u, and provides a current state output S, and a state output from a previous iteration $S_{t-1}$ to the SAC agent 62.

The simulation environment 68, which is used during training, includes the following components.
1. Battery: Modeled as an equivalent circuit with internal resistance and state of charge. It provides electric power to the propulsion system.
2. Electric Motor: Accepts electrical power input and produces effective mechanical power output, modeled by piecewise-quadratic functions with respect to the electric motor shaft rotation speed.
3. Gas Turbine: Produces mechanical power, with its rate of change modeled in relation to fuel consumption and shaft rotation speed. Empirical constraints limit its operational boundaries.
4. Aircraft Dynamics: Incorporates factors like drag, lift, and acceleration, leading to dynamic equations governing the aircraft's motion.

The simulation environment 68 also includes a system configuration, which in the example of FIG. 1 is a parallel configuration (the gas turbine 11 and electric motor 12 operate in parallel). However, as mentioned above, a series configuration could be used (power output from the electric motor 12 is delivered by a combination of an electric generator and a gas turbine 11).

Therefore, in summary, the overall simulation environment includes:
The motion of the hybrid electric aircraft propulsion system is constrained by its dynamic equations.
The dynamics consider the aerodynamics, including lift, drag, and other forces acting on the aircraft.
The propulsion system combines power from both the gas turbine and the electric motor.

The objective of the simulation environment 68 is to optimize energy management strategies for the hybrid electric aircraft propulsion systems, considering various operational conditions and constraints.

The SAC agent 62 utilizes the state output S, and the reward R, as part of the generation of the randomized power splitting profile in a subsequent iteration.

During training, the SAC agent 62 updates its actor and critic properties at regular intervals, and estimates the mean and standard deviation of a Gaussian probability distribution for a continuous action space, and then randomly selects actions based on the distribution for output as the power splitting profiles u. During training, the SAC agent 62 updates an entropy weight term that balances the expected return and the entropy of the policy, and also stores past experience using a circular experience "replay" buffer 70. The agent updates the actor and critic using a mini-batch of experiences randomly sampled from the buffer.

In the Soft Actor-Critic (SAC) reinforcement learning algorithm, entropy regularization is used to promote exploration during training. The "entropy term" is a measure of the randomness (or unpredictability) of the policy, and by adding this term to the objective function, SAC encourages the policy to behave in a more exploratory manner.

The entropy weight term, often denoted as α, determines the trade-off between exploration and exploitation. Specifically
a larger α value places more emphasis on exploration, as the policy is rewarded more for being random, and
a smaller α value places more emphasis on exploitation, making the policy more deterministic based on the learned Q-values.

The objective in SAC is not only to maximize the expected return (like in traditional RL algorithms) but also to maximize the entropy of the policy. This results in a balance between gaining more reward (exploitation) and exploring various actions (exploration).

One of the notable features of SAC is the adaptive tuning of the entropy weight α. While some implementations of SAC keep α fixed, others adjust it during training to ensure that the entropy of the policy remains close to a desired target. This automatic tuning can help stabilize training and achieve better performance in various environments.

Figure 6:
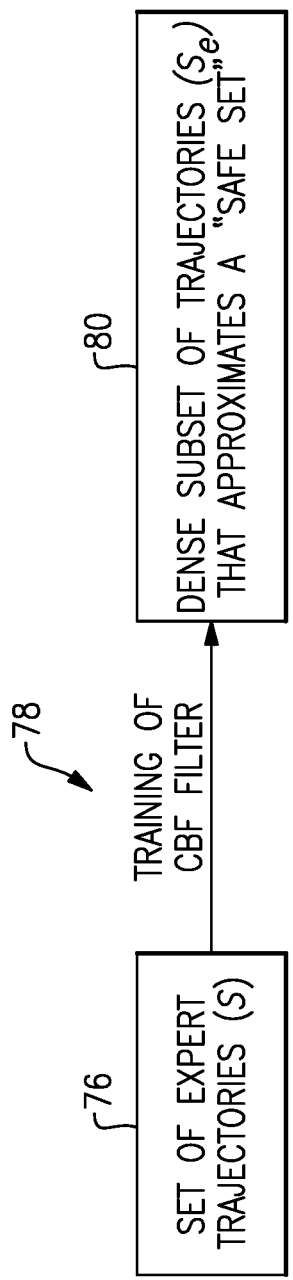
FIG. 6 is a first schematic view of a how a CBF filter of FIG. 4 is trained.

FIG. 6 is a first schematic view of how the CBF filter 64 of FIG. 4 is trained. As shown, a set of "expert trajectories" S 76 is provided. Each trajectory in the set 76 is a data trajectories that includes values such as battery state of charge, rate of change of both fuel mass, rate of change of battery state of charge, and the corresponding control inputs $P_{gt}$ and $P_{em}$. The set 76 of expert trajectories is utilized for training (schematically shown as 78) of the CBF filter 64, such that the CBF filter 64 learns a dense subset of the trajectories Se that closely approximates a "safe set" (i.e., the trajectories that do not violate the system constraints 50 of FIG. 3).

Below, a number of mathematical expressions are provided. Although some are equations (with an equal sign), and some are expressions that lack an equal sign, they will all be referred to as "equations" below (and with corresponding abbreviation "eq").

Figure 7:
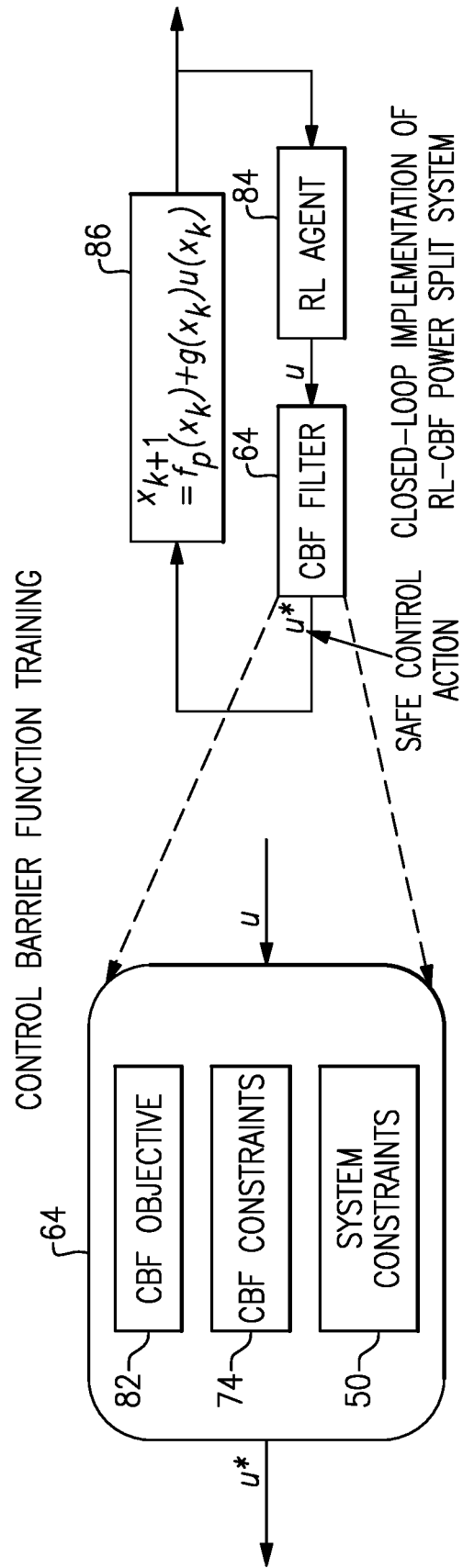
FIG. 7 is a second schematic view of the CBF filter of FIG. 4 is trained.

FIG. 7 is a second schematic view of how the CBF filter 64 of FIG. 4 is trained. Equation 1 below is a generic equation for the HEP system 10.

$$\dot{x} = f(x) + g(x)u, \text{ with } u \in \mathcal{U} \qquad \text{eq. 1}$$

where $\dot{x}$ is the time-derivative of the system states: for the CBF design consideration, they are taken as: the time-derivative of fuel mass and battery state of charge;
f(x) is a modeling function that is initially unknown;
g(x) is another modeling function that is initially unknown;
u is a control action that is a vector containing the power demands $P_{gt}$ and $P_{em}$; and
U is the set of admissible set (the control actions that yield the system variables are inside the safe set).

$$S := \{x | h(x,u) \geq 0\} \qquad \text{eq. 2}$$

where S is the safe set; and
h is a control barrier function.

$$\sup \dot{h}(x, u) \geq -\alpha(h(x, u)), \forall x \in S \qquad \text{eq. 3}$$

where α is a class-k function (a type of function that starts at zero and only goes up as its argument moves right).

$$\sup_{u \in \mathcal{U}} \frac{\partial h}{\partial x}(f(x) + g(x)u) \geq -a(h(x, u)), \forall\, x \in S \qquad \text{eq. 4}$$

Equation 3 resembles the condition that is needed to be satisfied to ensure compliance with the system constraints. In one or more embodiments, for equation 3 to be satisfied, the generated control law actions need to be generated for only the "safe actions" such that the system variables belong (stay) only inside the safe set S (that complies with the system constraints). Therefore, conservatively, in these one or more embodiments the time-derivative of h needs to be greater or equal to zero.

Equation 5 below is used to comply with the "safe set."

$$\forall x \in \partial(S), u \in \mathcal{U}_{s.t.} \dot{h}(x, u) \geq 0 \qquad \text{eq. 5}$$

where $\partial$ is the boundary set (in this case the boundary of the "safe set" S); and
$\dot{h}$ is time-derivative of function h.

Below, equation 6 represents a CBF objective 82 of the CBF filter 64.

$$u^* += \arg\min |u - u_o|^2 \qquad \text{eq. 6}$$

Equations 7-14 represent the CBF constraints 74. In particular, equation 7 (and its related equations 8-9) represents a CBF constraint which is based on mass rate of change dynamics of an aircraft that includes the HEP system 10 due to fuel consumption, and equation 10 (and its related equations 11-13) represents a CBF constraint which is based on battery state of charge dynamics of the at least one battery 13.

$$F_m + B_m P_{gt} \leq c_m \qquad \text{eq. 7}$$

where: $F_m$ is a mass of the fuel X;
$B_m$ is a term defined 9 below, where one divides the right-hand side by $P_{gt}$;
$P_{gt}$ is an output power of the gas turbine 11 (see FIG. 1); and
$c_m$ may be the upper and lower bounds of the fuel mass, and in this case resembles the maximum fuel consumption (the initial starting fuel level);

$$m_{k+1} = F_m + B_m P_{gt} \qquad \text{eq. 8}$$

$$F_m \triangleq m_k, \ B_m P_{gt} \triangleq (f_m + g_m P_{gt}) t_s \qquad \text{eq. 9}$$

where $t_s$ is a sampling interval.
$f_m$ is an approximated nonlinearity term that is identified using experimental data and is described as a nonlinear polynomial function (this function characterizes the power loss due to the consumed fuel) and is also the negative of the term $\phi$ (see also equation 15 below);

$$F_{SoC} + B_{SoC} P_{em} \leq c_{SoC} \qquad \text{eq. 10}$$

where: $F_{SoC}$ is the SoC state of the battery 13;
$B_{SoC}$ is similar to the $B_m$ function above, but $B_{SoC}$ can be calculated from equation 12 below by dividing the right-hand side of equation 12 by $P_{em}$;
$P_{em}$ is an output power of the X (see FIG. X); and
$c_{SoC}$ is calculated based on the system constraints shown in FIG. 3.

$$SoC_{k+1} = F_{SoC} + B_{SoC} P_{em} \qquad \text{eq. 11}$$

$$B_{SoC} \triangleq SoC_k; \ B_{SoC} P_{em} \triangleq (f_{SoC} + g_{SoC} P_{em}) t_s \qquad \text{eq. 12}$$

$$SoC_k - SoC_{ref} \geq 0, \qquad \text{eq. 13}$$

where SoC is a state of charge of the one or more batteries 13
$C_k$ is a current state of charge; and
$C_{ref}$ is a reference state of charge.

$$P_{gt} + P_{em} \geq P_{drv} \qquad \text{eq. 14}$$

In FIG. 7, the system constraints 50 represent the system constraints 50 shown in FIG. 3. A reinforcement learning agent 84 is utilized so model behavior 86 can be learned (that corresponds to equation 1 above).

Referring again to FIG. 4, the reward function 72 can be designed according to equation 16 below.

Reward Function Design:

$$R = \alpha_m \int_0^t \phi(P_{gt}) dt + \alpha_{gt} P_{gt}^2 + \alpha_{em} P_{em}^2 \qquad \text{eq. 15}$$

where $\alpha_m$, $\alpha_{gt}$, $\alpha_{em}$ are penalty coefficients.

In the context of reinforcement learning (RL), a penalty coefficient is a factor applied to undesirable actions or states to discourage the agent from taking or reaching them. When designing the reward function 72, certain actions or outcomes might be undesirable or detrimental to the goal. By assigning a penalty (usually a negative reward) to these actions or outcomes, the RL agent is trained to avoid them. The penalty coefficient determines the severity of the penalty. A higher coefficient means a stronger discouragement from that particular action or state. By fine-tuning this coefficient, one can influence the agent's behavior and its learning process.

The training of SAC agent 62 with reinforcement learning is performed while combined with the CBF filter 64, which itself has been trained with deep learning. The reward function 72 design utilizes the following observation states, which are all discussed above:

$\phi$
$SoC_k - SoC_{ref}$
$P_{drv}$
$P_{gt}(k-1)$
$P_{em}(k-1)$.

Figure 8:
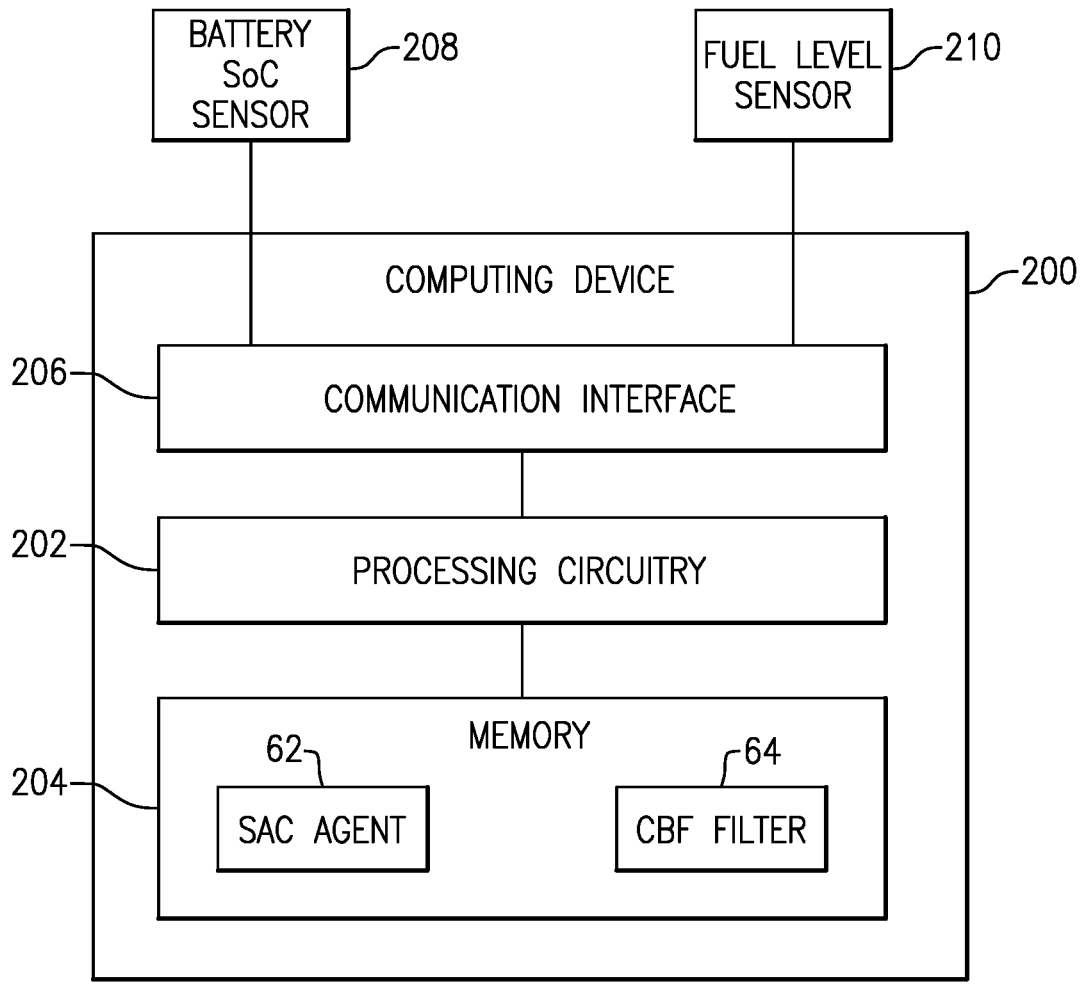
FIG. 8 is a schematic view of an example computing device that may be utilized to perform the method of FIG. 5.

FIG. 8 is a schematic view of an example computing device 200 that may be utilized to perform the method of FIG. 5 and/or to be utilized as the controller 34 of FIG. 1. The computing device 200 includes processing circuitry 202 operatively connected to memory 204 and a communication interface 206. The processing circuitry 202 may include as one or more microprocessors, microcontrollers, application specific integrated circuits (ASICs), or the like. The memory 204 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 204 may incorporate electronic, magnetic, optical, and/or other types of storage media. The communication interface 206 is operable to communicate with external devices for sending and receiving data, such as a battery state of charge sensor 208 for measuring a state of charge of the battery 13, and a fuel level sensor 210 for measuring a fuel level of the fuel 23. In the example of FIG. 8, the memory stores at least the SAC agent 62 and the CBF filter 64. The computing device 200 may also be the device that trains the SAC agent 62 and/or the CBF filter 64.

The techniques described herein provide favorable results for solving the complex and non-convex problem of optimizing fuel consumption, and provide a number of benefits over prior art techniques. Instead of requiring a preexisting system model, an acceptable model can be approximated as described above with the model behavior block 86. Also, instead of requiring a detailed mission profile in advance, the method 100 can be utilized without such knowledge. Moreover, the trained RL SAC-CBF agent is computationally efficient, which can make real-time implementation feasible.

The CBF filter 64 may also be useful in ensuring safety of the system. For example, utilization of the CBF filter 64 could potentially be used to prevent any external or unexpected commands, if the command was not part of the "safe set" of the CBF program 65 that includes the Control Barrier Certificate.

The system of FIG. 4 and its corresponding method in FIG. 6 showed better performance as compared to either of the known charge-depleting charge-sustaining (CDCS) approach or the non-linear predictive control (NMPC) approach.

Although the soft actor-critic framework has been discussed at length herein, it is understood that other actor-critic frameworks could be utilized, such as Proximal Policy Optimization (PPO), Trust Region Policy Optimization (TRPO), Deep Deterministic Policy Gradient (DDPG), or Twin-Delayed Deep Deterministic (TD3) Policy Gradient Agents.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method for a hybrid electric propulsion (HEP) system, comprising:
  utilizing a soft actor-critic agent, which includes at least one neural network, and a control barrier function (CBF) filter to obtain a power splitting profile for an HEP system, the power splitting profile including an electric motor power for an electric motor of the HEP system and a gas turbine power for a gas turbine of the HEP system, wherein the electric motor power and gas turbine power collectively provide a combined HEP output power; and
  during a flight of an aircraft that includes the HEP system, performing an output action for the HEP system based on the power splitting profile;
  wherein said utilizing is performed based on a predefined fuel consumption objective and a state of charge of at least one battery that powers the electric motor.

2. The method of claim 1, comprising:
  iteratively repeating said utilizing and performing throughout the flight to obtain a plurality of sequential power splitting profiles and performing output actions for the plurality of sequential power splitting profiles.

3. The method of claim 2, wherein:
  the CBF filter performs filtering based on a CBF certificate trained to implement one or more CBF constraints and one or more system constraints; and
  said utilizing the CBF filter during a given iteration comprises:
    obtaining a power splitting profile from the soft actor-critic agent;
    utilizing the CBF filter to determine whether the power splitting profile complies with the one or more CBF constraints and the one or more system constraints; and
    based on the power splitting profile not complying with the one or more CBF constraints, adjusting the power splitting profile;
  wherein said performing the output action is performed based on the adjusted power splitting profile.

4. The method of claim 3, wherein the one or more CBF constraints include at least one of:
  a first constraint based on mass rate of change dynamics of the HEP system due to fuel consumption; and
  a second constraint based on battery state of charge dynamics of the at least one battery.

5. The method of claim 2, wherein the one or more system constraints include at least one of:
  a predefined range of acceptable battery state of charge values;
  a predefined range of acceptable turbine output power values for the gas turbine; and
  a predefined range of acceptable combined HEP output power values for the HEP system.

6. The method of claim 3, comprising:
  utilizing deep learning to train the CBF filter based on a plurality of predefined expert trajectories that include power splitting profiles; and
  creating the CBF certificate based on ones of the predefined expert trajectories that satisfy the one or more CBF constraints.

7. The method of claim 6, wherein the at least one neural network includes at least one actor neural network and at least one critic neural network, and the method comprises, after the training of the CBF filter, training the at least one neural network by iteratively:
  cooperatively utilizing the at least one actor neural network and the at least one critic neural network to generate a randomized power splitting profile based on an output of a reward function output from a previous iteration;
  ranking the randomized power splitting profile using the reward function; and
  providing an output of the reward function to the soft actor-critic agent for a subsequent iteration.

8. The method of claim 7, comprising during each iteration, and prior to performing said ranking:
  providing the randomized power splitting profile to the CBF filter;
  utilizing the CBF filter to determine whether the randomized power splitting profile complies with the one or more CBF constraints; and
  based on the randomized power splitting profile complying with the one or more CBF constraints, adjusting the randomized power splitting profile, and performing said ranking for the adjusted randomized power splitting profile.

9. The method of claim 8, wherein said cooperatively utilizing the at least one actor neural network and the at least one critic neural network to generate a randomized power splitting profile comprises, during each of a plurality of iterations:
  utilizing a replay buffer to obtain a previous power splitting profile; and
  further basing said cooperatively utilizing on the previous power splitting profile.

10. The method of claim 1, wherein the fuel consumption objective is to minimize fuel consumption while avoiding full reliance on the electric motor for delivering the combined HEP output power at a beginning stage of a flight.

11. A system for a hybrid electric propulsion (HEP) system, comprising:
  processing circuitry operatively connected to memory, and configured to:
    utilize a soft actor-critic agent, which includes at least one neural network, and a control barrier function (CBF) filter to obtain a power splitting profile for an HEP system, the power splitting profile including an electric motor power for an electric motor of the HEP system and a gas turbine power for a gas turbine of the HEP system, wherein the electric motor power and gas turbine power collectively provide a combined HEP output power; and during a flight of an aircraft that includes the HEP system, perform an output action for the HEP system based on the power splitting profile;

wherein the utilization is performed based on a predefined fuel consumption objective and a state of charge of at least one battery that powers the electric motor.

12. The system of claim 11, wherein the processing circuitry is configured to:

iteratively repeat said utilization and performance throughout the flight to obtain a plurality of sequential power splitting profiles and perform output actions for the plurality of sequential power splitting profiles.

13. The system of claim 12, wherein:

the CBF filter performs filtering based on a CBF certificate trained to implement one or more CBF constraints and one or more system constraints; and to utilize the CBF filter, the processing circuitry is configured to, during a given iteration:

obtain a power splitting profile from the soft actor-critic agent;

utilize the CBF filter to determine whether the power splitting profile complies with the one or more CBF constraints and the one or more system constraints; and based on the power splitting profile not complying with the one or more CBF constraints, adjust the power splitting profile;

wherein the performance of the output action is based on the adjusted power splitting profile.

14. The system of claim 13, wherein the one or more CBF constraints include at least one of:

a first constraint based on mass rate of change dynamics of the HEP system due to fuel consumption; and a second constraint based on battery state of charge dynamics of the at least one battery.

15. The system of claim 12, wherein the one or more system constraints include at least one of:

a predefined range of acceptable battery state of charge values;

a predefined range of acceptable turbine output power values for the gas turbine; and a predefined range of acceptable combined HEP output power values for the HEP system.

16. The system of claim 13, where the processing circuitry is configured to:

utilize deep learning to train the CBF filter based on a plurality of predefined expert trajectories that include power splitting profiles; and create the CBF certificate based on ones of the predefined expert trajectories that satisfy the one or more CBF constraints.

17. The system of claim 16, wherein the at least one neural network includes at least one actor neural network and at least one critic neural network, and the processing circuitry is configured to, after the training of the CBF filter, train the at least one neural network by iteratively:

cooperatively utilizing the at least one actor neural network and the at least one critic neural network to generate a randomized power splitting profile based on an output of a reward function output from a previous iteration;

ranking the randomized power splitting profile using the reward function; and providing an output of the reward function to the soft actor-critic agent for a subsequent iteration.

18. The system of claim 17, wherein the processing circuitry is configured to, during each iteration, and prior to performing said ranking:

provide the randomized power splitting profile to the CBF filter;

utilize the CBF filter to determine whether the randomized power splitting profile complies with the one or more CBF constraints; and based on the randomized power splitting profile complying with the one or more CBF constraints, adjust the randomized power splitting profile, and perform said ranking for the adjusted randomized power splitting profile.

19. The system of claim 18, wherein to cooperatively utilize the at least one actor neural network and the at least one critic neural network to generate a randomized power splitting profile, the processing circuitry is configured to, during each of a plurality of iterations:

utilize a replay buffer to obtain a previous power splitting profile; and further base said cooperatively utilization on the previous power splitting profile.

20. The system of claim 11, wherein the fuel consumption objective is to minimize fuel consumption while avoiding full reliance on the electric motor for delivering the combined HEP output power at a beginning stage of a flight.

* * * * *